(12) United States Patent
Overby et al.

(10) Patent No.: US 7,546,483 B1
(45) Date of Patent: Jun. 9, 2009

(54) OFFLOADING RAID FUNCTIONS TO A GRAPHICS COPROCESSOR

(75) Inventors: Mark A. Overby, Bothell, WA (US); David G. Reed, Saratoga, CA (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 513 days.

(21) Appl. No.: 11/252,852

(22) Filed: Oct. 18, 2005

(51) Int. Cl.
*G06F 11/00* (2006.01)

(52) U.S. Cl. .............. 714/6; 711/114; 712/34

(58) Field of Classification Search ............ 714/6, 714/800, 805, 801; 711/114, 161, 162; 712/34
See application file for complete search history.

(56) References Cited

U.S. PATENT DOCUMENTS

| | | | |
|---|---|---|---|
| 5,805,788 A * | 9/1998 | Johnson | 714/6 |
| 5,917,505 A * | 6/1999 | Larson | 345/522 |
| 6,185,652 B1 * | 2/2001 | Shek et al. | 710/263 |
| 7,200,716 B1 * | 4/2007 | Aiello | 711/114 |
| 7,444,637 B2 * | 10/2008 | Pronovost et al. | 718/104 |
| 2005/0210166 A1 * | 9/2005 | Chow et al. | 710/51 |
| 2006/0026328 A1 * | 2/2006 | Li | 710/306 |
| 2008/0008314 A1 * | 1/2008 | Dempski et al. | 380/37 |

OTHER PUBLICATIONS

Coko et al. "Secret key cryptography using graphics cards." Columbia University Computer Science Department Technical Report CUCS-002-04. Jan. 14, 2004. retrieved from "http://www.cs.columbia.edu/~library/TR-repository/reports/reports-2004/cucs-002-04.pdf".*

* cited by examiner

*Primary Examiner*—Robert Beausoliel
*Assistant Examiner*—Philip Guyton
(74) *Attorney, Agent, or Firm*—Patterson & Sheridan, LLP

(57) ABSTRACT

Systems and methods for using a graphics processor to perform RAID parity functions may improve disk access performance. A method is provided for configuring a graphics processor to perform XOR parity computations when data is written to the RAID array. Another method is provided for configuring the graphics processor to perform the XOR parity computations to restore data when a disk is damaged. Using the graphics processor as a coprocessor to offload parity computations from a central processing unit may improve disk access performance and overall system performance.

8 Claims, 9 Drawing Sheets

PRIOR ART

OFFLOADING RAID FUNCTIONS TO A GRAPHICS COPROCESSOR

BACKGROUND OF THE INVENTION

1. Field of the Invention

One or more aspects of the invention generally relate to a parity function in RAID systems, and more particularly to using a graphics processor to compute XOR parity and use parity to reproduce data stored on a degraded disk.

2. Description of the Related Art

Conventional computing systems including a RAID array perform parity computations using a central processing unit (CPU) or a dedicated special purpose processor. Parity must be recomputed whenever data is written to the RAID array and is used to reconstruct data stored on a degraded disk.

FIG. 1A is a conceptual diagram of a prior art organization of data in a RAID array 100. RAID array 100 includes four disks, disk 110, 120, 130, and 140. The disks are organized in stripes, where a stripe includes data elements from each disk. For example, a first stripe includes data 10, data 20, data 30, and parity 40. Similarly, a second strip includes parity 11, data 21, data 31, and data 41. Parity 40 is computed as the XOR of data 10, data 20, and data 30 and parity 11 is computed as the XOR of data 21, data 31, and data 41. If any one of disks 110, 120, 130, or 140 is degraded the data elements stored on that disk may be recovered using the data elements stored on the other disks. For example, data 43 may be reconstructed by computing the XOR of parity 33, data 23 and data 13. Similarly, data 12 may be reconstructed by computing the XOR of parity 22, data 32, and data 42.

FIG. 1B is a block diagram of a prior art system 150 including a CPU 155, system memory 170, chipset 160, and RAID array 100. When data is written to RAID array 100 by CPU 155 parity must be recomputed for each affected stripe of RAID array 100. If needed, the data portions of the affected stripes are transferred by chipset 160 from RAID array 100 to system memory 170. CPU 155 reads the data portions and computes parity for each affected stripe and stores the parity value in a parity buffer in system memory 170. CPU 155 typically performs an XOR operation on a cache line at a time, reading two cache lines, XORing the two cache lines, and storing the result in system memory 170. The reading, XORing, and writing is repeated for the stripe data from each disk until all of the stripe data is XORed to produce the parity data for the stripe. When CPU 155 is computing parity it is unavailable to perform other processing. When CPU 155 is finished computing parity, the parity buffer stored in system memory 170 is written to RAID array 100 by chipset 160.

Similarly, when a disk is degraded, the data elements from the other disks are transferred by chipset 160 from RAID array 100 to system memory 170. CPU 155 reads the data elements and reconstructs the data for the degraded disk and stores the data in a data buffer in system memory 170. When CPU 155 is reconstructing the data it is unavailable to perform other processing. When CPU 155 is finished reconstructing the data, the data buffer stored in system memory 170 is written to the degraded disk by chipset 160.

Accordingly, it is desirable offload the parity functions, e.g., computing parity and reconstructing data using parity, to another processor to free CPU 155 to perform other operations. Offloading the parity functions from CPU 155 may improve overall system performance.

SUMMARY OF THE INVENTION

The current invention involves new systems and methods for using a graphics processor to perform RAID parity functions. A method is provided for configuring a graphics processor to perform XOR parity computations when data is written to the RAID array. Another method is provided for configuring the graphics processor to perform the XOR parity computations to restore data when a disk is damaged. Using the graphics processor as a coprocessor to offload parity computations from a central processing unit may improve disk access performance and overall system performance.

Various embodiments of the invention include a system for using a graphics processor as a coprocessor to perform RAID parity functions. The system includes a RAID array, a media communications processor, a central processing unit, and a graphics processor. The RAID array includes at least three disk drives configured to store data. The media communications processor coupled to the RAID array and configured to read the data from the RAID array and write the data to the RAID array. The central processing unit coupled to the media communications processor and configured to access the data stored on the RAID array. The graphics processor coupled to the media communications processor and configured to perform the RAID parity functions.

Various embodiments of a method of the invention for using a graphics processor as a coprocessor to perform RAID parity functions include notifying the graphics processor that a source buffer and a data buffer are available for processing, performing a bitwise XOR of the source buffer and the data buffer to produce a parity value, storing the parity value in a parity buffer, and notifying a storage driver that the parity buffer is available for storage in a RAID array.

Various embodiments of the invention are a computer-readable medium containing a program which, when executed by a computing device, configures a graphics processor to perform a process for computing RAID parity functions. The process includes notifying the graphics processor that a source buffer and a data buffer are available for processing, performing a bitwise XOR of the source buffer and the data buffer to produce a parity value, storing the parity value in a parity buffer, and notifying a storage driver that the parity buffer is available for storage in a RAID array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The present invention provides a means for using an auxiliary processor, such as a graphics processor to perform RAID parity functions. Overall system performance may be improved by offloading RAID parity functions from the CPU to a graphics processor. The graphics processor may be configured to compute parity and to reconstruct data for a degraded disk. The graphics processor may use a dedicated frame buffer memory to store intermediate results and the computed parity buffer and/or data buffer.

Figure 1A:
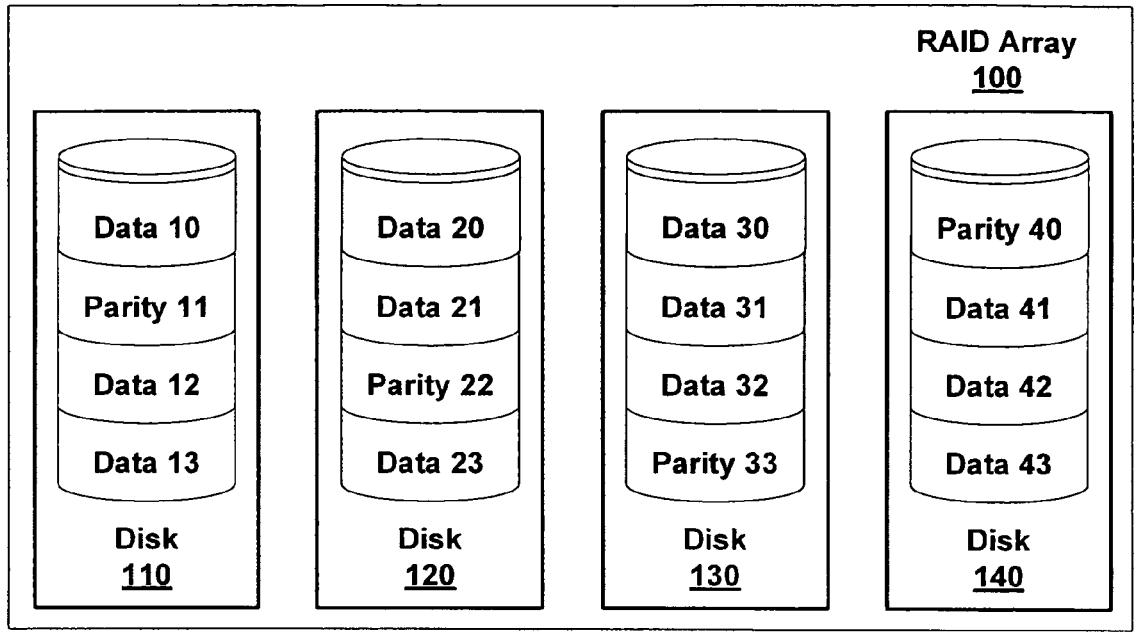
FIG. 1A is a conceptual diagram of a prior art organization of data in a RAID array.
Figure 1B:
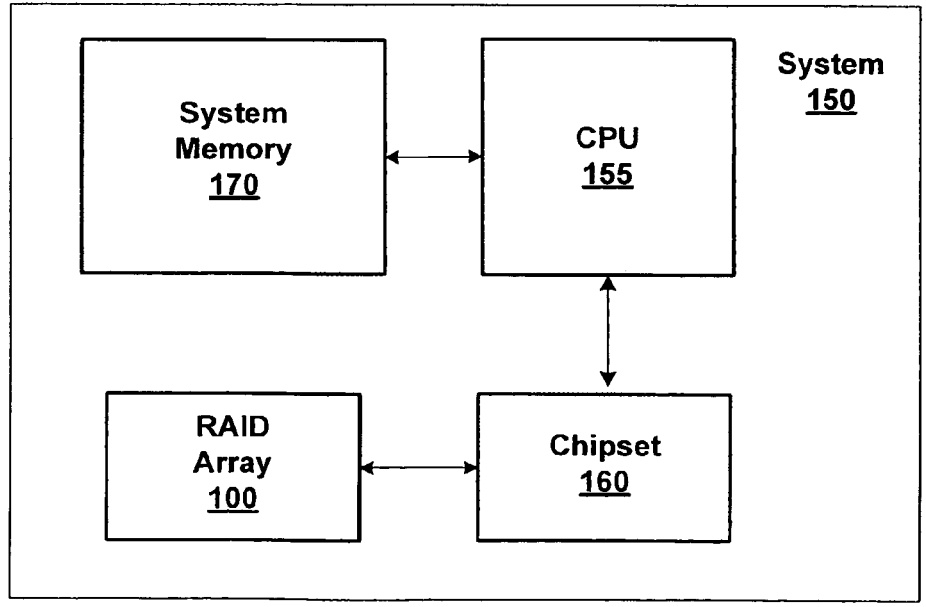
FIG. 1B is a block diagram of a prior art system including a CPU and RAID array.
Figure 2A:
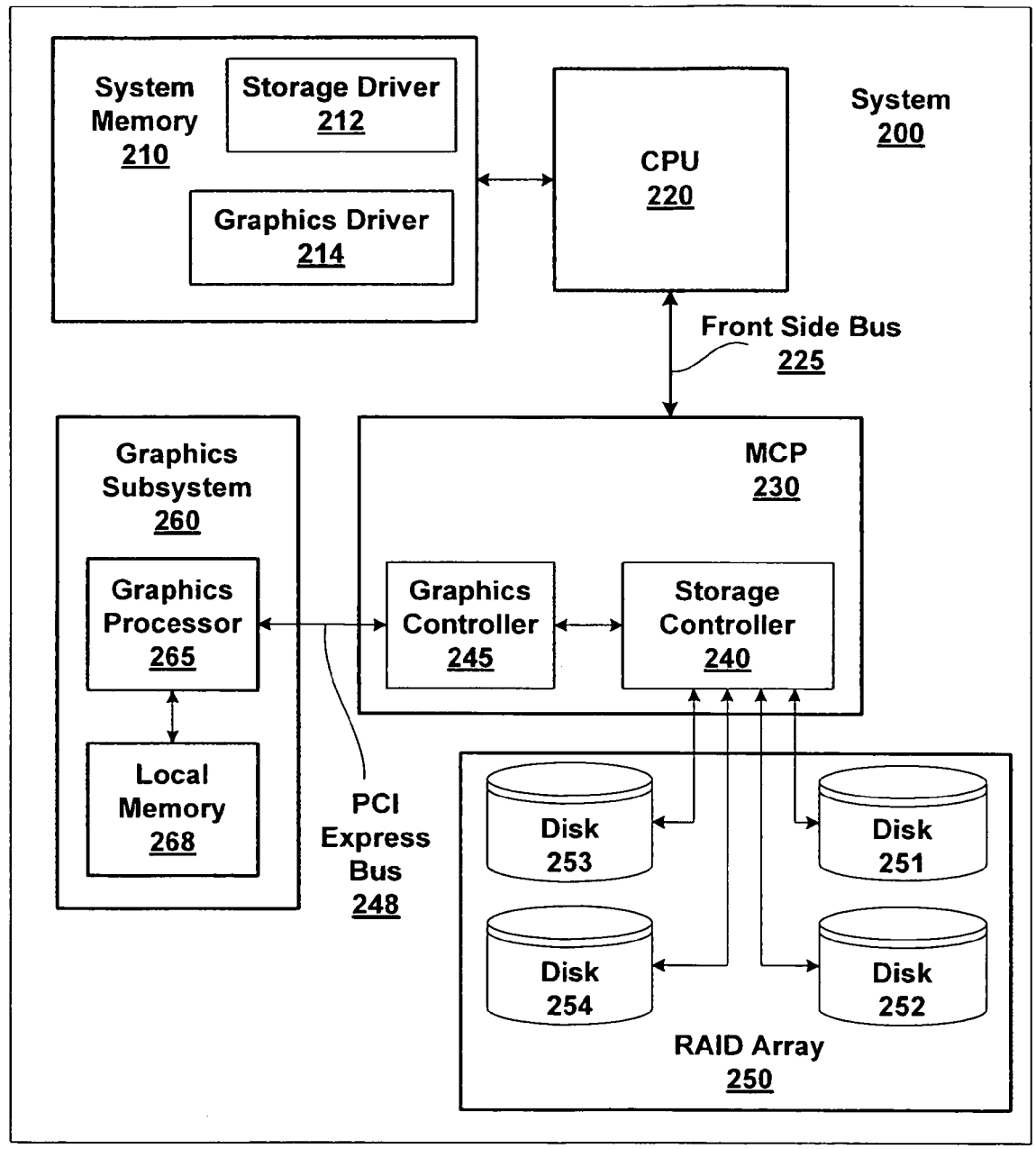
FIG. 2A is a block diagram of an exemplary embodiment of a respective system in accordance with one or more aspects of the present invention including a CPU, graphics processor, and RAID array.

FIG. 2A is a block diagram of an exemplary embodiment of a respective system 200 in accordance with one or more aspects of the present invention. System 200 includes a CPU 220, a system memory 210, a MCP (media and communications processor) 230, a graphics subsystem 260, and a RAID array 250. System 200 may be a desktop computer, server, laptop computer, palm-sized computer, tablet computer, game console, portable wireless terminal such as a personal digital assistant (PDA) or cellular telephone, computer based simulator, or the like. CPU 220 may include a system memory controller to interface directly to system memory 210. In alternate embodiments of the present invention, CPU 220 may communicate with system memory 210 through a system interface, e.g., I/O (input/output) interface or a bridge device.

MCP 230 is coupled to CPU 220 via a high bandwidth interface, front side bus 225. In some embodiments of the present invention front side bus 225 uses a peripheral component interface (PCI) hypertransport protocol. MCP 230 includes a storage controller 240, such as a RAID 5 controller, a RAID 0 controller, a RAID 1 controller, or the like. In other embodiments of the present invention, MCP 230 may include additional ports such as universal serial bus (USB), accelerated graphics port (AGP), and the like. Each hard disk 251, 252, 253, and 254 may be replaced or removed, so at any particular time, system 200 may include fewer or more hard disk drives. Storage controller 240 facilitates data transfers between CPU 220, Graphics subsystem 260, and RAID array 250, including transfers for performing parity functions. In some embodiments of the present invention, storage controller 240 performs block striping and/or data mirroring based on instructions received from storage driver 112. Each disk 150 coupled to storage controller 240 includes drive electronics that control storing and reading of data within the individual disk 251, 252, 253, and 254. Data is passed between storage controller 240 and each disk 251, 252, 253, and 254 via a bidirectional bus. Each hard disk drive 150 and 155 includes drive electronics that control storing and reading of data within the individual hard disk drive.

System memory 210 stores programs and data used by CPU 220, including storage driver 212 and a graphics driver 214. Storage driver 212 communicates between the operating system (OS) and storage controller 240 within MCP 230 to perform RAID management functions such as detection and reporting of disk failures, maintaining state data for each disk within RAID array 250, and transferring data between system memory 210 and RAID array 250. Graphics driver 214 communicates between the OS and graphics processor 265 within graphics subsystem 260, configuring graphics processor 265 to process data according to graphics programs and to read or write data to/from system memory 210. Graphics subsystem 260 is coupled to MCP 230 via a high bandwidth bus, such as PCI Express bus 248. In some embodiments of the present invention, graphics processor 265 is an auxiliary processor configured to perform a variety of different types of processing to offload CPU 220. For example graphics processor 265 may perform media processing of video data, audio data, or processing of other types of data to offload CPU 220.

Figure 2B:
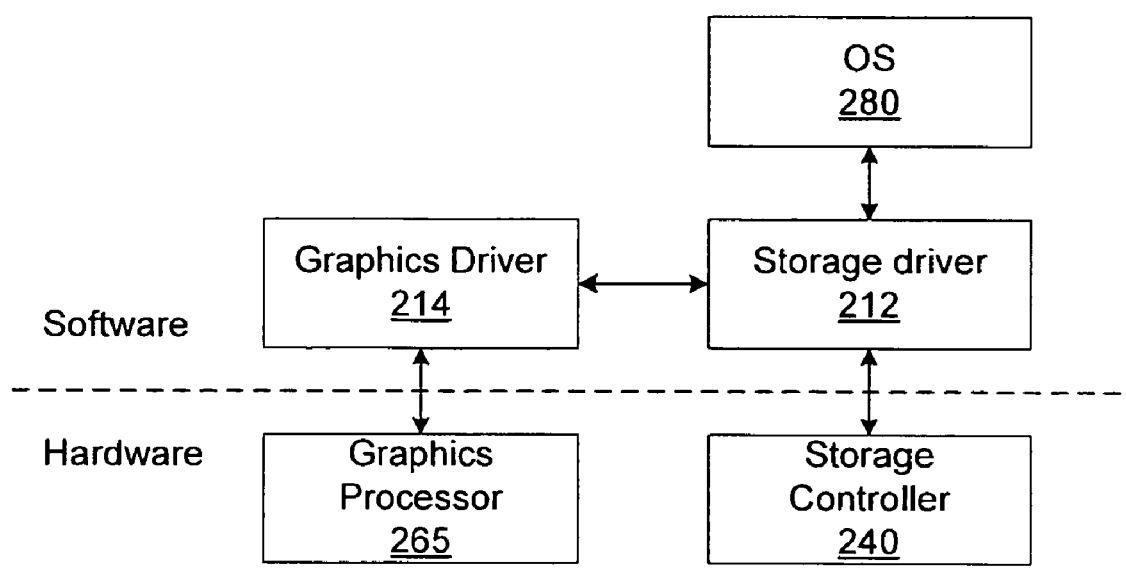
FIG. 2B is a conceptual diagram of the communication paths between hardware and software in the system of FIG. 2A in accordance with one or more aspects of the present invention.

FIG. 2B is a conceptual diagram of the communication paths between hardware and software in the system of FIG. 2A in accordance with one or more aspects of the present invention. Graphics driver 214 translates graphics programs into instructions for execution by graphics processor 265. Graphics driver 214 also configures graphics processor 265 to perform parity functions, including reading data and parity values from system memory 210. Storage driver 112 communicates between OS 280 and storage controller 240 to transfer data between RAID array 250 and system memory 210. Storage driver 112 and graphics driver 214 communicate with each other to offload the parity functions as described in conjunction with FIGS. 3A and 4A. Storage driver 112 and graphics driver 214 are provided by the system designer and/or manufacturer of system 200.

Figure 3A:
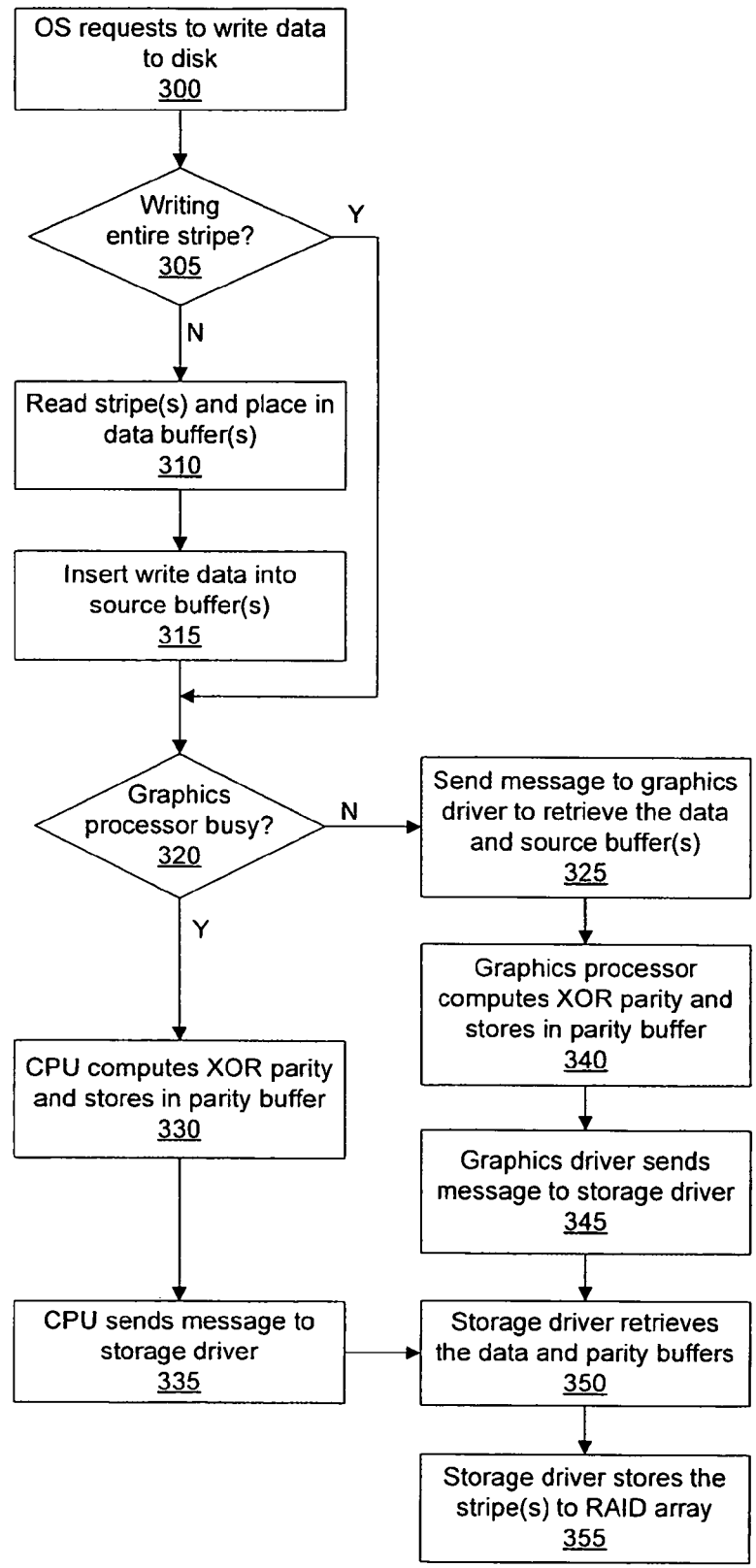
FIG. 3A is an exemplary embodiment of a method of using a graphics processor as a coprocessor to perform RAID parity functions in accordance with one or more aspects of the present invention.

FIG. 3A is an exemplary embodiment of a method of using graphics subsystem 260 as a coprocessor to perform RAID parity functions in accordance with one or more aspects of the present invention. In step 3000S 280 requests storage driver 212 to write data to a disk in RAID array 250. In step 305 storage driver 212 determines if the write request will replace one or more entire stripes of RAID array 250, and, if so, storage driver proceeds to step 320. When an entire stripe is replaced it is not necessary to read data from RAID array 250. If, in step 305 storage driver 212 determines that an entire stripe will not be written, then in step 310 storage driver 212 reads the stripe(s) that will be affected by the write request. The stripe(s) read in step 310 are stored in one or more source buffers in system memory 210. In one embodiment of the present invention, data for a single stripe in stored in a different source buffer for each disk. In other embodiments of the present invention each stripe is stored in a single source buffer. In step 315 storage driver 212 inserts the write data into the source buffer(s) affected by the write. Each source buffer that includes write data is called a data buffer. When an entire stripe is written all of the source buffers for the stripe are data buffers.

In step 320 storage driver 212 determines if graphics subsystem 260 is busy and not available to perform parity functions. If, in step 320 storage driver 212 determines that graphics subsystem 260 is busy, then in step 330 CPU 220 (instructed by storage driver 212) computes an XOR parity value for each affected stripe and stores the parity value(s) in a parity buffer in system memory 210. In step 335 CPU 220 sends a message to storage driver 212 that the parity computation is complete.

If, in step 320 storage driver 212 determines that graphics subsystem 260 is not busy, then in step 325 storage driver 212 sends a message to graphics driver 214 to retrieve the data buffer(s) from system memory 210 and graphics processor 265 reads (via direct memory access) the data and source buffers from system memory 210 and stores the data and source buffers in local memory 268, i.e., frame buffer memory. In step 340 graphics driver 214 configures graphics processor 265 to compute an XOR parity value for each affected stripe, as described in conjunction with FIG. 3B, and store the parity value(s) in a parity buffer in system memory 210. In step 345 graphics driver 214 sends a message to storage driver 212 that the parity computation is complete. In step 350 storage driver 212 retrieves the parity buffer from system memory 210. In step 355 storage driver 212 writes the affected stripe(s), including parity, to RAID array 250.

Figure 3B:
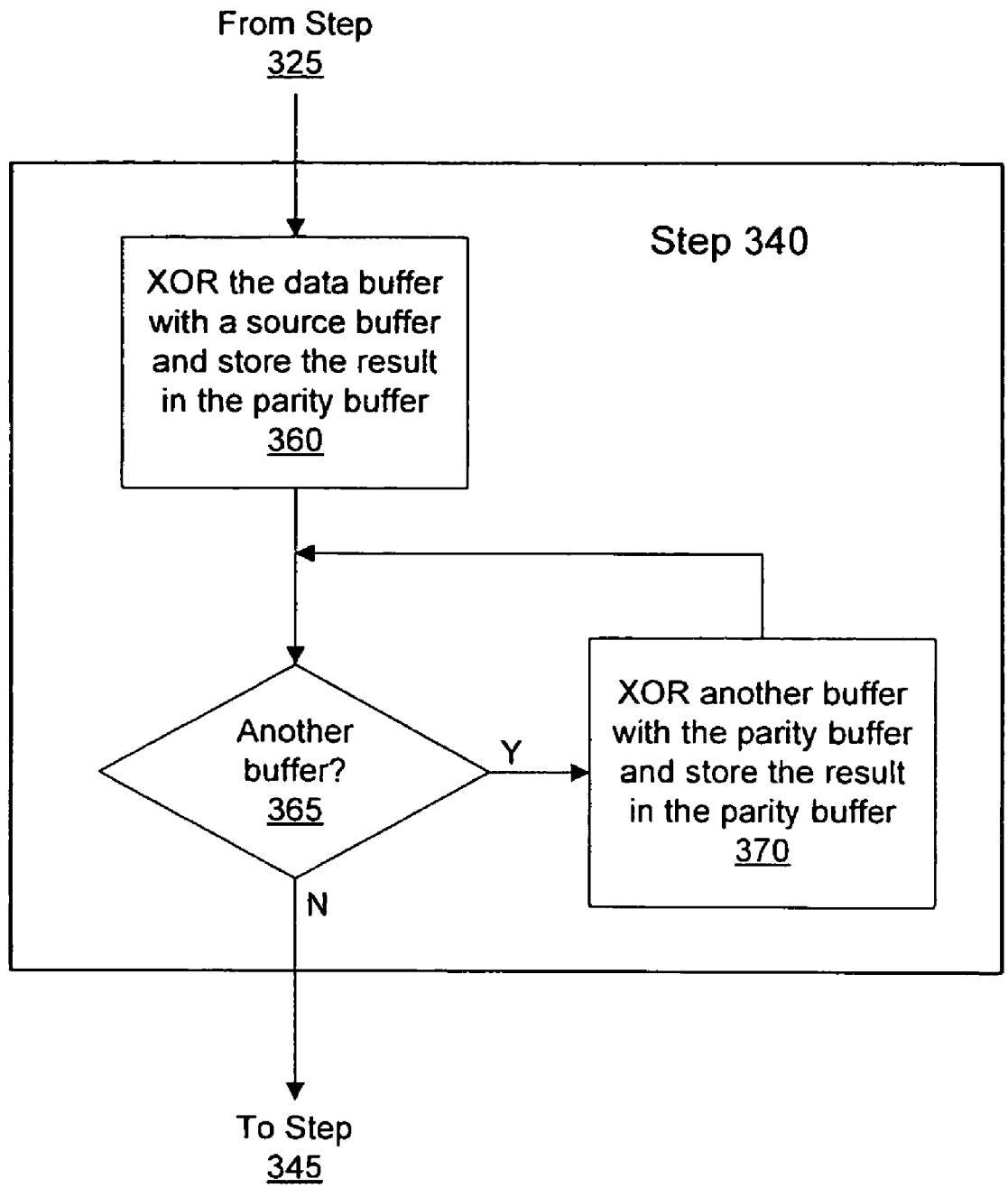
FIG. 3B is an exemplary embodiment of a method of performing step 340 of FIG. 3A in accordance with one or more aspects of the present invention.

FIG. 3B is an exemplary embodiment of a method of performing step 340 of FIG. 3A in accordance with one or more aspects of the present invention. In step 360 graphics driver 214 configures graphics processor 265 to perform a bitwise XOR on a first buffer and a second buffer, where the first and second buffers may each be either a data or source buffer for a stripe, and store the result in a parity buffer in local memory 268. In some embodiments of the present invention, graphics processor 265 may not store the data, source, and parity buffers in local memory 268 and instead may read and write the buffers to/from system memory 210.

Graphics driver 214 may configure graphics processor 265 to perform a bitwise XOR using a shader program to read the first and second buffers as texture data and produce the parity values. Alternatively, graphics driver 214 may instruct graphics processor 265 to perform a source destination bitmask (SDB) operation to combine the first and second buffers using an XOR to produce the parity values.

In step 365 graphics driver 214 (or graphics processor 265) determines if another source or data buffer should be included in the parity computation for the stripe, and, if so, in step 370 graphics processor 265 performs a bitwise XOR between the additional buffer and the parity buffer and stores the result in the parity buffer. Steps 365 and 370 are repeated for each source and data buffer for a stripe. If, in step 365 graphics driver 214 (or graphics processor 265) determines that all of the source and data buffers have been included in the parity computation for the stripe, then the parity computation is complete and graphics driver 214 proceeds to step 345.

Figure 4A:
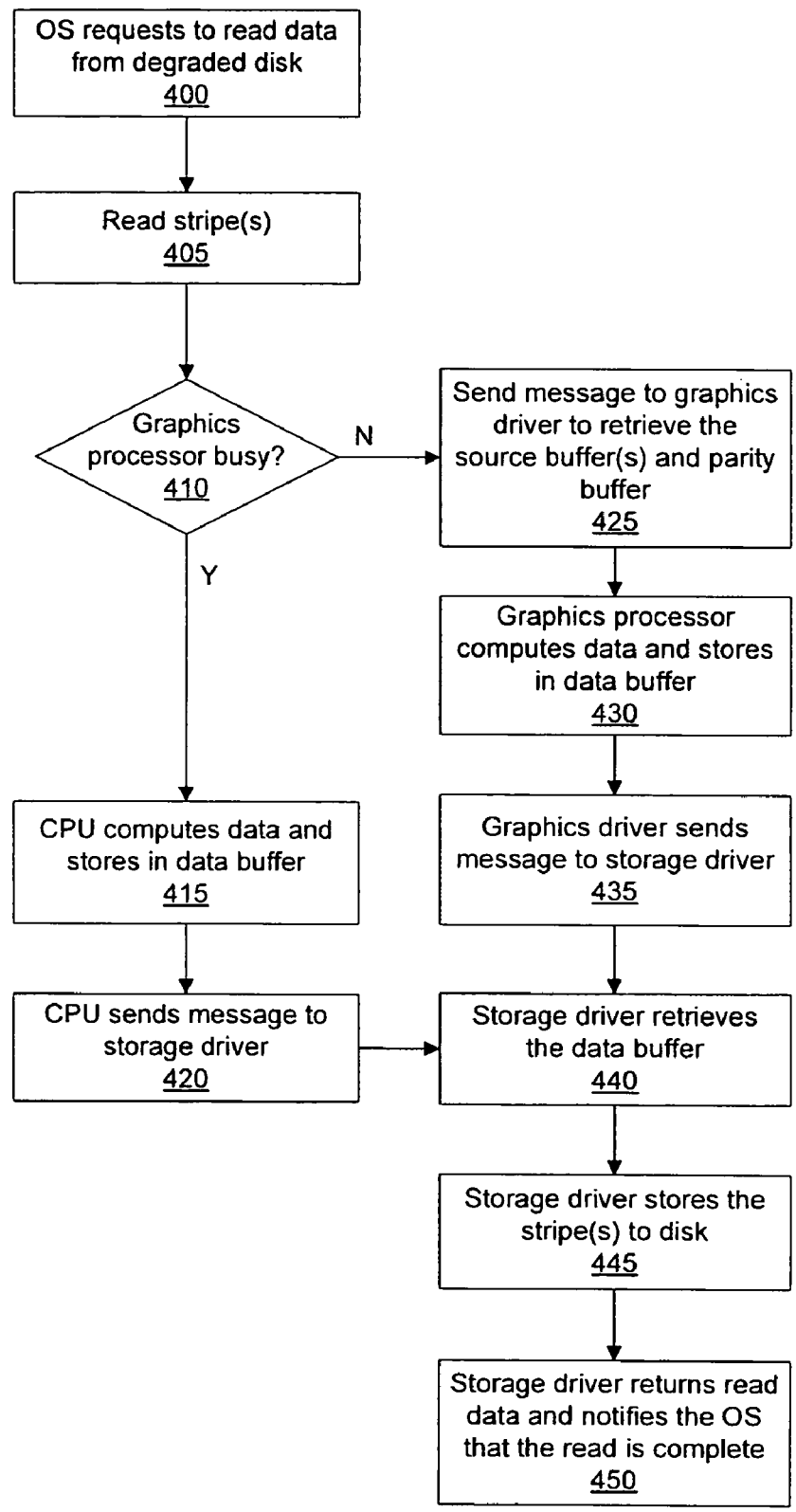
FIG. 4A is another exemplary embodiment of method of using a graphics processor as a coprocessor to perform RAID parity functions in accordance with one or more aspects of the present invention.

FIG. 4A is another exemplary embodiment of method of using graphics subsystem 260 as a coprocessor to perform RAID parity functions in accordance with one or more aspects of the present invention. In step 400 OS 280 requests storage driver 212 to read data from a degraded disk in RAID array 250. In step 405 storage driver 212 reads the stripe(s) requested by OS 280. The stripe(s) read in step 405 are stored in one or more source and parity buffers in system memory 210.

In step 410 storage driver 212 determines if graphics subsystem 260 is busy and not available to perform parity functions. If, in step 410 storage driver 212 determines that graphics subsystem 260 is busy, then in step 415 CPU 220 (instructed by storage driver 212) reconstructs the data for the degraded disk and stores the reconstructed data for the degraded disk in a data buffer in system memory 210. In step 420 CPU 220 sends a message to storage driver 212 that the data restoration is complete.

If, in step 410 storage driver 212 determines that graphics subsystem 260 is not busy, then in step 425 storage driver 212 sends a message to graphics driver 214 to retrieve the source and parity buffers from system memory 210 and graphics processor 265 reads (via direct memory access) the source and parity buffers from system memory 210 and stores the source and parity buffers in local memory 268. In step 430 graphics driver 214 configures graphics processor 265 to reconstruct the data for the degraded disk, as described in conjunction with FIG. 4B, and store the reconstructed data in a data buffer in system memory 210. In step 435 graphics driver 214 sends a message to storage driver 212 that the data restoration is complete. In step 440 storage driver 212 retrieves the data buffer from system memory 210. In step 445 storage driver 212 returns the data requested by OS 280 in step 400 and notifies OS 280 that the read is complete.

Figure 4B:
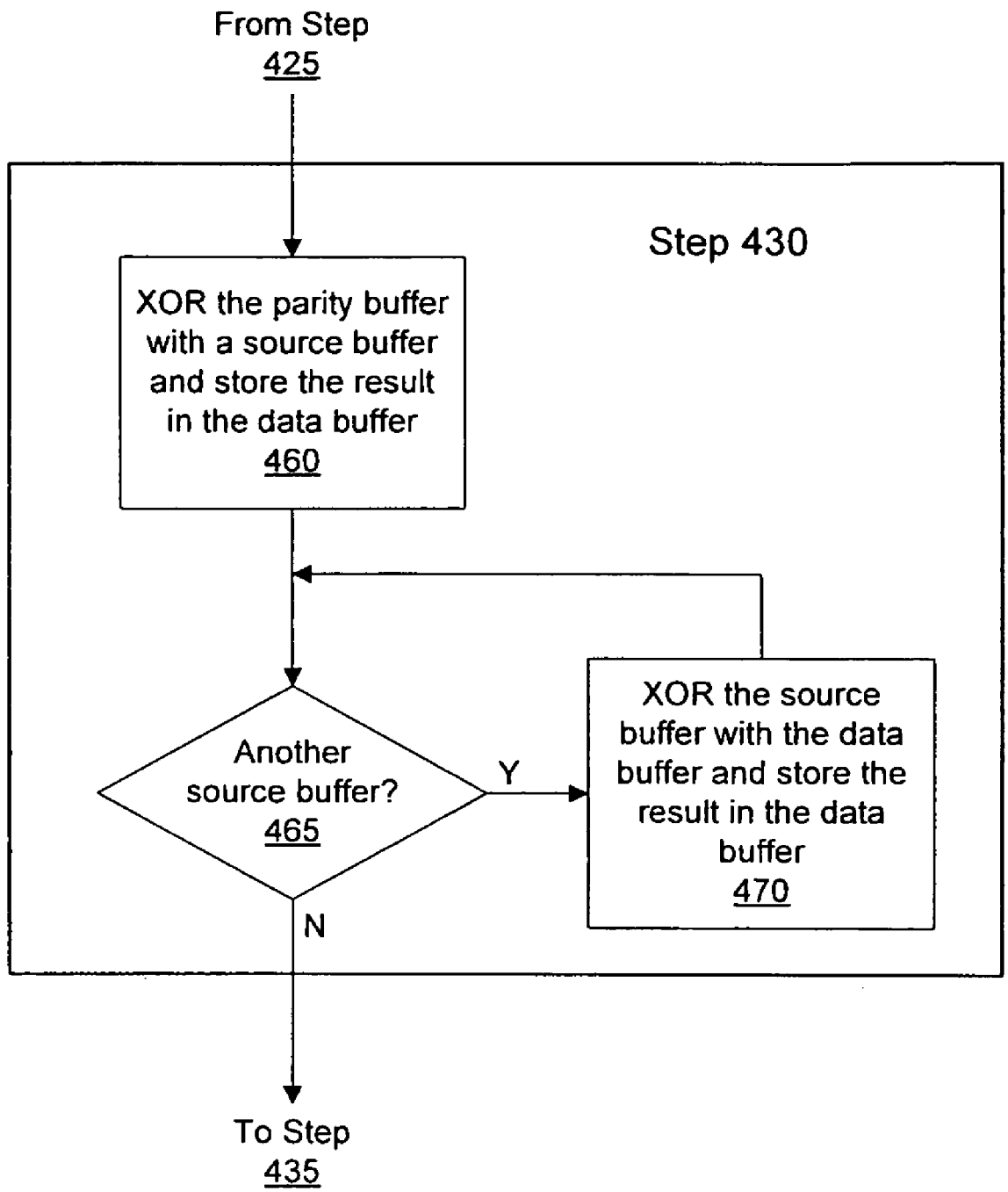
FIG. 4B is an exemplary embodiment of a method of performing step 430 of FIG. 4A in accordance with one or more aspects of the present invention.

FIG. 4B is an exemplary embodiment of a method of performing step 430 of FIG. 4A in accordance with one or more aspects of the present invention. In step 460 graphics driver 214 configures graphics processor 265 to perform a bitwise XOR on a first buffer and a second buffer, where the first buffer is a parity buffer for a stripe and the second buffer is a source buffer for the same stripe, and store the result in a data buffer in local memory 268. In some embodiments of the present invention, graphics processor 265 may not store the data, source, and parity buffers in local memory 268 and instead may read and write the buffers to/from system memory 210.

As previously described in conjunction with FIG. 3B, graphics driver 214 may configure graphics processor 265 to perform a bitwise XOR using a shader program to read the first and second buffers as texture data and produce the reconstructed data. Alternatively, graphics driver 214 may instruct graphics processor 265 to perform a source destination bitmask (SDB) operation to combine the first and second buffers using an XOR to produce the reconstructed data.

In step 465 graphics driver 214 (or graphics processor 265) determines if another source should be processed to reconstruct the data for the stripe, and, if so, in step 470 graphics processor 265 performs a bitwise XOR between the additional buffer and the data buffer and stores the result in the data buffer. Steps 465 and 370 are repeated for each source buffer (except the degraded source buffer) in a stripe. If, in step 465 graphics driver 214 (or graphics processor 265) determines that all of the source buffers have been included in the data reconstruction for the stripe, then the parity computation is complete and graphics driver 214 proceeds to step 435.

By configuring graphics processor 265 to perform the RAID parity functions, a resource which is otherwise idle is used to offload CPU 220, permitting CPU 220 to perform other operations. Overall system performance may be improved by offloading the parity functions and using graphics processor 265 as a coprocessor. Persons skilled in the art will appreciate that any system configured to perform the method steps of FIGS. 3A, 3B, 4A, or 4B or their equivalents, is within the scope of the present invention.

Figure 5:
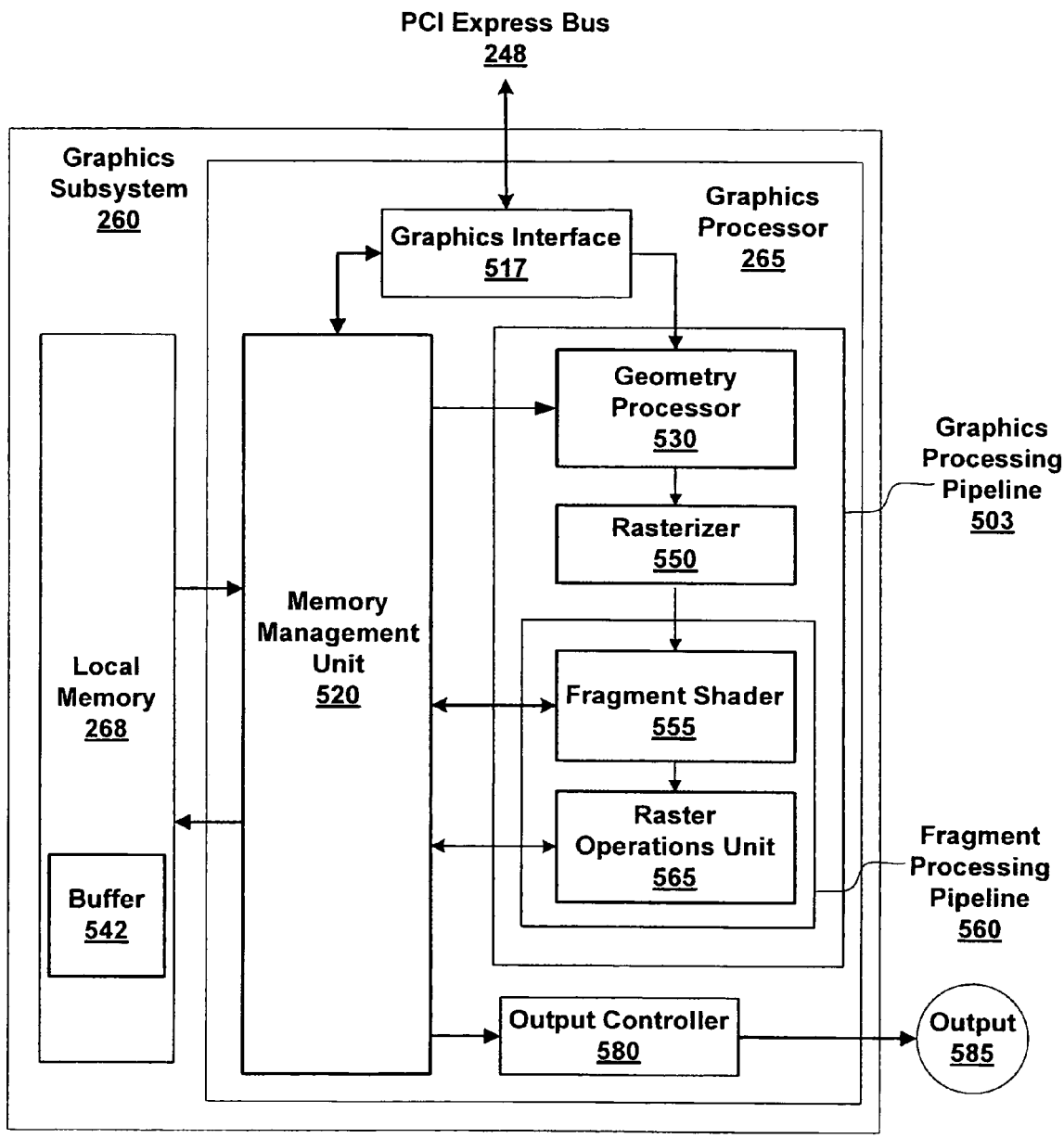
FIG. 5 is a block diagram of an exemplary embodiment of a graphics processor in accordance with one or more aspects of the present invention.

FIG. 5 is a block diagram of an exemplary embodiment of graphics subsystem 260 in accordance with one or more aspects of the present invention. Graphics subsystem 260 includes a local memory 268 and programmable graphics processor 265. CPU 220 communicates with graphics subsystem 260 via a connection, such as PCI express bus 248 and a graphics interface 517 within programmable graphics processor 265. Data, program instructions, and commands received at graphics interface 517 can be passed to a graphics processing pipeline 503 or written to a local memory 268 through memory management unit 520. Programmable graphics processor 265 uses memory to store surface data, including texture maps, source buffers, data buffers, and parity buffers, and program instructions, where surface data is any data that is input to or output from computation units within programmable graphics processor 205.

In addition to graphics interface 517, programmable graphics processor 265 includes a graphics processing pipeline 503, memory management unit 520 and an output controller 580. Data and program instructions received at graphics interface 517 can be passed to a geometry processor 530 within graphics processing pipeline 503 or written to local memory 268 through memory management unit 520. In addition to communicating with local memory 268, and graphics interface 517, memory management unit 520 also communicates with graphics processing pipeline 503 and output controller 580 through read and write interfaces in graphics processing pipeline 503 and a read interface in output controller 580.

Within graphics processing pipeline 503, geometry processor 530 and a programmable graphics fragment processing pipeline, fragment processing pipeline 560, perform a variety of computational functions. Some of these functions are table lookup, scalar and vector addition, multiplication, division, coordinate-system mapping, calculation of vector normals, tessellation, calculation of derivatives, interpolation, filtering, and the like. Fragment processing pipeline 560 may also be configured to perform Boolean operations including XOR. Geometry processor 530 and fragment processing pipeline 560 are optionally configured such that data processing operations are performed in multiple passes through graphics processing pipeline 503 or in multiple passes through fragment processing pipeline 560. Each pass through programmable graphics processor 265, graphics processing pipeline 503 or fragment processing pipeline 560 concludes with optional processing by a raster operations unit 565.

Vertex programs are sequences of vertex program instructions compiled for execution within geometry processor 530 and rasterizer 550. Shader programs are sequences of shader program instructions compiled for execution within fragment processing pipeline 560. Geometry processor 530 receives a stream of program instructions (vertex program instructions and shader program instructions) and data from graphics interface 517 or memory management unit 520, and performs vector floating-point operations or other processing operations using the data. The program instructions configure sub-units within geometry processor 530, rasterizer 550 and fragment processing pipeline 560. The program instructions and data are stored in graphics memory, e.g., portions of system memory 210, local memory 268, or storage resources within programmable graphics processor 505.

When a portion of system memory 210 is used to store program instructions and data, the portion of system memory 210 can be uncached so as to increase performance of access by programmable graphics processor 265. Alternatively, configuration information is written to registers within geometry processor 530, rasterizer 550 and fragment processing pipeline 560 using program instructions, encoded with the data, or the like.

It may be advantageous to store computed intermediate data, such as computed parity values or data values in local memory 268. For example, intermediate results, e.g., partially computed parity values or reconstructed data values, may be stored in buffer 542, e.g., a parity buffer or data buffer, in local memory 268. Due to the nature of graphics data processing, the interface between memory management unit 520 and local memory 268 is typically a high bandwidth interface to facilitate transfers of data between graphics processing pipeline 503 and local memory 268. For example values may be read by fragment processing pipeline 560 from source, data, or parity buffers stored in local memory 268, parity and data values (final or intermediate) are computed, and the results are transferred into local memory 268 for storage. During the reconstruction of a data buffer or computation of a parity buffer memory the data transfers may occur within graphics subsystem 260, freeing front side bus 225 for other data transfers. Using graphics subsystem 260 to perform RAID parity computations offloads CPU 220 and front side bus 225, permitting CPU 220 to perform other operations and possibly improving overall system performance.

Data processed by geometry processor 530 and program instructions are passed from geometry processor 530 to a rasterizer 550. Rasterizer 550 is a sampling unit that processes primitives and generates sub-primitive data, such as fragment data, including parameters associated with fragments (texture identifiers, texture coordinates, and the like). Rasterizer 550 converts the primitives into sub-primitive data by performing scan conversion on the data processed by geometry processor 530. Rasterizer 550 outputs fragment data and shader program instructions to fragment processing pipeline 560. When geometry processor 530 and rasterizer 550 are configured to perform RAID parity functions, data from source, data, or parity buffers may be simply passed through those units.

The shader programs configure the fragment processing pipeline 560 to process fragment data by specifying computations and computation precision. Fragment shader 555 is optionally configured by shader program instructions such that fragment data processing operations are performed in multiple passes within fragment shader 555. Fragment shader 555 outputs the shaded fragment data, e.g., parity values or reconstructed data values, and codewords generated from shader program instructions to raster operations unit 565.

Raster operations unit 565 includes a read interface and a write interface to memory management unit 520 through which raster operations unit 565 accesses data stored in local memory 268 or system memory 210. Raster operations unit 565 optionally performs near and far plane clipping and raster operations, such as stencil, z test, blending, and the like, using the fragment data and pixel data stored in local memory 268 or system memory 210 at a pixel position (buffer address specified by x,y coordinates) associated with the processed fragment data, e.g., computed parity values or reconstructed data values. The output data from raster operations unit 565 is written back to local memory 268 or system memory 210 at the buffer address associated with the output data and the results.

When processing is completed, an output 585 of graphics subsystem 260 is provided using output controller 580. Alternatively, CPU 220 reads the buffer, such as buffer 542, stored in local memory 268 through memory management unit 520, graphics interface 517 and MCP 230. Output controller 580 is optionally configured by opcodes to deliver data to a display device, network, electronic control system, other system 200, other graphics subsystem 260, MCP 230, or the like.

Figure 6:
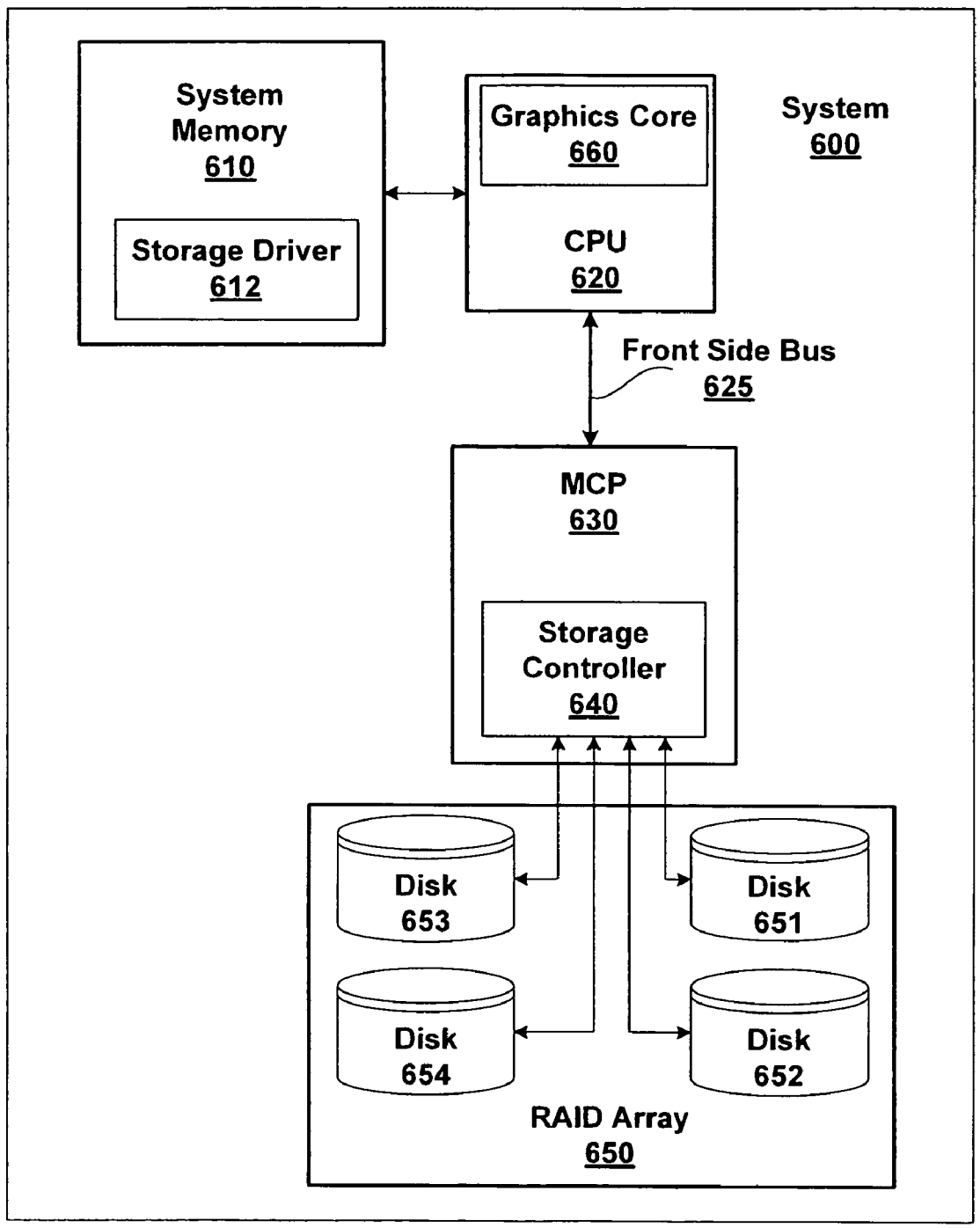
FIG. 6 is a block diagram of another exemplary embodiment of a respective system in accordance with one or more aspects of the present invention.

FIG. 6 is a block diagram of another exemplary embodiment of a respective system, system 600, in accordance with one or more aspects of the present invention. In contrast to system 500, the graphics processing functionality is integrated into CPU 620 by the inclusion of a graphics core 660. In this embodiment of the present invention, the parity functions may be offloaded from CPU 620 to graphics core 660 by storage driver 612. Intermediate results of the parity functions computed by graphics core 660, e.g., parity values and reconstructed data values, are stored in system memory 610. MCP 630, storage controller 640, RAID array 650, and disks 651, 652, 653, and 654 correspond to MCP 230, storage controller 240, RAID array 250, and disks 251, 252, 253, and 254, respectively.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A system for using a graphics processor as a coprocessor to perform RAID parity functions, the system comprising:
   a RAID array including at least three disk drives configured to store data;
   a media communications processor coupled to the RAID array and configured to read the data from the RAID array and write the data to the RAID array;
   a central processing unit coupled to the media communications processor and configured to access the data stored on the RAID array; and
   a graphics processor coupled to the media communications processor and configured to perform the RAID parity functions and to process graphics primitives to produce image data.

2. The system of claim 1, wherein the graphics processor is configured to compute a parity value by performing a bitwise XOR using a source buffer and a data buffer stored on the RAID array.

3. The system of claim 1, wherein the graphics processor is configured to reconstruct a data buffer by performing a bitwise XOR on a source buffer and a parity buffer stored on the RAID array.

4. The system of claim 1, wherein the graphics processor is integrated within the central processing unit.

5. The system of claim 1, further comprising dedicated local memory that is coupled to the graphics processor and configured to store at least one of a data buffer, a source buffer, and a parity buffer.

6. The system of claim 1, wherein the graphics processor performs the RAID parity functions by executing a shader program.

7. The system of claim 1, wherein the graphics processor performs the RAID parity functions by executing a source destination bitmask instruction.

8. The system of claim 1, further comprising a storage driver configured to offload the parity functions to the graphics processor when the graphics processor is available.

* * * * *